(12) United States Patent
Poncelet et al.

(10) Patent No.: US 7,560,092 B2
(45) Date of Patent: *Jul. 14, 2009

(54) METHOD FOR PREPARING AN ALUMINOSILICATE POLYMER AND THE POLYMER RESULTING FROM THIS METHOD

(75) Inventors: Olivier J. Poncelet, Industrie (FR); Stephanie V. Desrousseaux, Industrie (FR)

(73) Assignee: Eastman Kodak Company, Rochester, NY (US)

( * ) Notice: Subject to any disclaimer, the term of this patent is extended or adjusted under 35 U.S.C. 154(b) by 481 days.

This patent is subject to a terminal disclaimer.

(21) Appl. No.: 10/521,348

(22) PCT Filed: Jul. 14, 2003

(86) PCT No.: PCT/EP03/07579

§ 371 (c)(1),
(2), (4) Date: Jan. 13, 2005

(87) PCT Pub. No.: WO2004/039724

PCT Pub. Date: May 13, 2004

(65) Prior Publication Data

US 2006/0045833 A1    Mar. 2, 2006

(30) Foreign Application Priority Data

Jul. 18, 2002    (FR)    .................. 02 09085

(51) Int. Cl.
*C01B 39/00*    (2006.01)
*C01B 33/26*    (2006.01)

(52) U.S. Cl. .................. 423/711; 423/328.1; 423/330.1; 423/710

(58) Field of Classification Search .............. 423/328.1, 423/330.1, 710, 711, 718
See application file for complete search history.

(56) References Cited

U.S. PATENT DOCUMENTS

| 4,152,404 | A | * | 5/1979 | Farmer | .................... 423/327.1 |
| 5,888,711 | A | * | 3/1999 | Poncelet et al. | ............. 430/527 |
| 6,468,492 | B2 | * | 10/2002 | Poncelet | .................. 423/328.1 |
| 7,132,165 | B2 | * | 11/2006 | Pinnavaia et al. | ........... 428/404 |
| 2002/0098142 | A1 | * | 7/2002 | Brasch et al. | ............ 423/328.1 |
| 2005/0238559 | A1 | * | 10/2005 | Poncelet et al. | .......... 423/328.1 |
| 2005/0253916 | A1 | * | 11/2005 | Poncelet et al. | ............. 347/105 |
| 2006/0066707 | A1 | * | 3/2006 | Poncelet et al. | ............. 347/106 |

FOREIGN PATENT DOCUMENTS

| EP | 0 0895 965 | 2/1999 |
| EP | 1 112 959 | 7/2001 |
| WO | WO 96 13459 | 5/1996 |

* cited by examiner

*Primary Examiner*—Kevin P Kerns
*Assistant Examiner*—John A Hevey
(74) *Attorney, Agent, or Firm*—J. Jeffrey Hawley; Arthur E. Kluegel

(57) ABSTRACT

The present invention relates to a method for preparing an aluminosilicate polymer and the polymer resulting from this method. Said method consists in treating an aluminum halide with an alkyl orthosilicate only having hydrolyzable functions with an aqueous alkali, in the presence of silanol groups, aluminum concentration being maintained at less than 0.3 mol/l, the Al/Si molar ratio being maintained between 1 and 3.6 and the alkali/Al molar ratio being maintained between 2.3 and 3; and then in stirring the resulting mixture at ambient temperature in the presence of silanol groups for long enough to form the aluminosilicate polymer.

17 Claims, 12 Drawing Sheets

METHOD FOR PREPARING AN ALUMINOSILICATE POLYMER AND THE POLYMER RESULTING FROM THIS METHOD

FIELD OF THE INVENTION

The present invention relates to a method for preparing an aluminosilicate polymer and to the polymer resulting from this method.

DESCRIPTION RELATIVE TO THE PRIOR ART

Aluminosilicate polymers are known in various forms. For example aluminosilicate polymers are known in fiber form, such as imogolite. Imogolite is a filamentary, tubular and crystallized aluminosilicate, present in the impure natural state in volcanic ashes and certain soils; it was described for the first time by Wada in J. Soil Sci. 1979, 30(2), 347-355. Imogolite can be synthesized with various degrees of purity using different methods. A method for obtaining an imogolite gel with a high degree of purity is described in Patent Application EP-A-1 112 959. This method consists in treating a mixed aluminum and silicon alkoxide with an aqueous alkali with pH between 4 and 6.5, by maintaining the aluminum molar concentration between $5.10^{-4}$ and $10^{-2}$ M and the Al/Si molar ratio between 1 and 3, then heating the resulting mixture in the presence of silanol groups for long enough to form the fibrous aluminosilicate polymer and eliminate the residual ions from the reaction medium.

Aluminosilicate polymers are also known in spherical particle form. U.S. Pat. No. 6,254,845 describes a method for preparing hollow spheres of amorphous aluminosilicate polymer. This method consists in mixing at high speed a silicon-based compound (0.01-1 mol/l) with an aluminum compound (0.01-1 mol/l) to form a suspension comprising a salt in solution as byproduct and precursor particles, eliminating a portion of the salt in solution and subjecting the precursor particles to heat treatment so as to obtain a porous material in the form of aluminosilicate hollow spheres. This porous material can be used in deodorants, humidity absorbers or in microencapsulated medicines.

SUMMARY OF THE INVENTION

The present invention provides a new method for preparing an aluminosilicate polymer and a new aluminosilicate polymer obtainable by this method.

The method of the present invention for preparing an aluminosilicate polymer, comprises the following steps:
a) treating a mixed aluminum and silicon alkoxide only comprising hydrolyzable functions, or a mixed aluminum and silicon precursor resulting from the hydrolysis of a mixture of aluminum compounds and silicon compounds only comprising hydrolyzable functions, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;
b) stirring the mixture resulting from step (a) at ambient temperature in the presence of silanol groups long enough to form the aluminosilicate polymer; and
c) eliminating the byproducts formed during steps a) and b) from the reaction medium.

Throughout the present description, the expression "hydrolyzable function" means a substituent eliminated by hydrolysis during the process and in particular at the time of treatment with the aqueous alkali. In the following, the expression "unmodified mixed aluminum and silicon alkoxide" or "unmodified mixed aluminum and silicon precursor" means respectively a mixed aluminum and silicon alkoxide only having hydrolyzable functions, or a mixed aluminum and silicon precursor resulting from the hydrolysis of a mixture of aluminum compounds and silicon compounds only having hydrolyzable functions. More generally, an "unmodified" compound is a compound that only comprises hydrolyzable substituents.

Step c) can be carried out according to different well-known methods, such as washing or diafiltration.

The present invention also relates to the aluminosilicate polymer material obtainable by the method defined above. This new polymer has an amorphous structure shown by electron diffraction. This material is characterized in that its Raman spectrum comprises in spectral region 200-600 $cm^{-1}$ a wide band at 250±6 $cm^{-1}$, a wide intense band at 359±6 $cm^{-1}$, a shoulder at 407±7 $cm^{-1}$, and a wide band at 501±6 $cm^{-1}$, the Raman spectrum being produced for the material resulting from step b) and before step c).

DETAILED DESCRIPTION OF THE INVENTION

Figure 1:
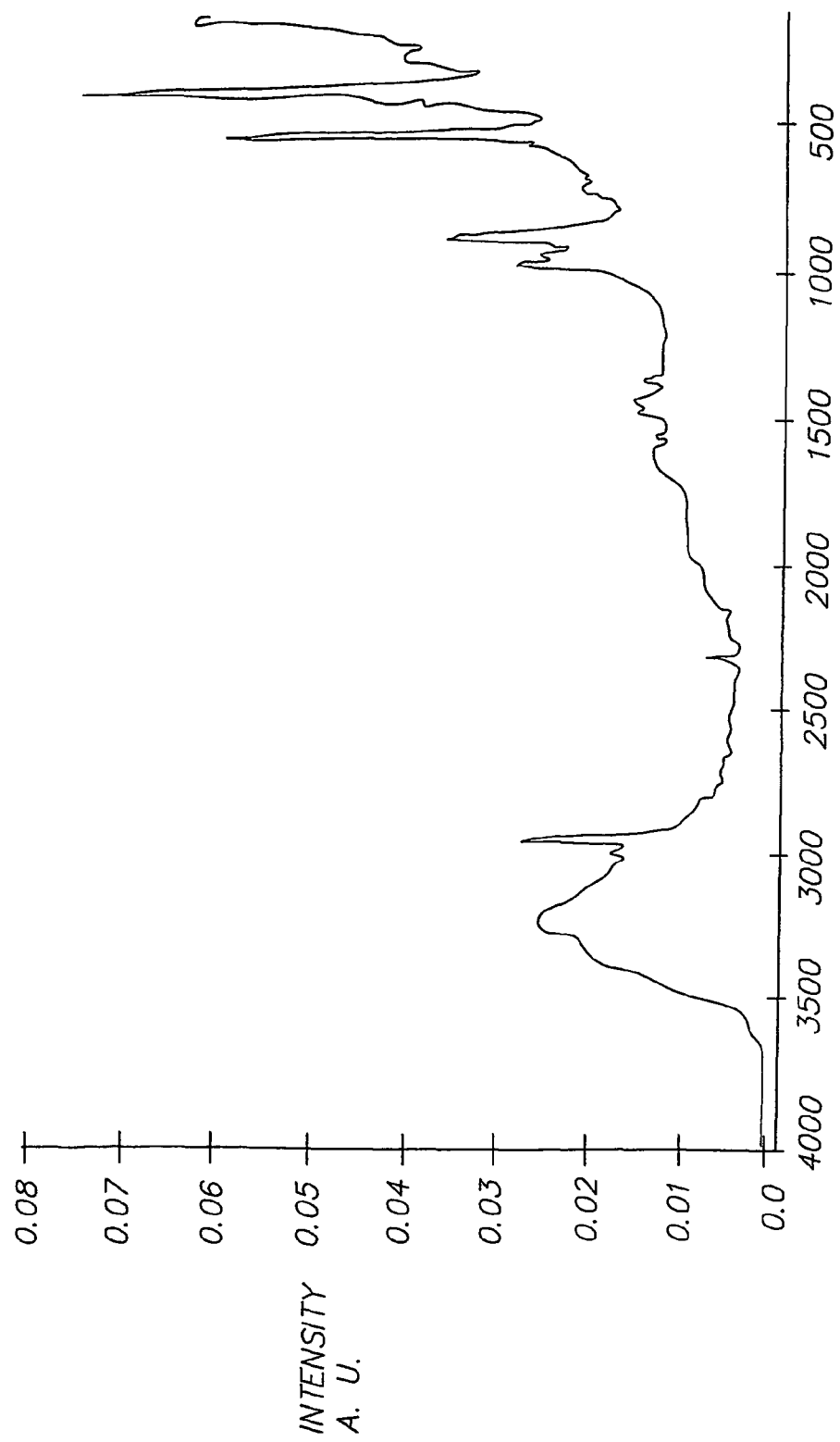
FIGS. 1 and 2 represent the spectra obtained by Raman spectroscopy of comparative aluminosilicate polymers prepared according to the methods described in Patent Application EP-A-1,112,959 and in Pat. U.S. Pat. No. 6,254,845 respectively.

According to one embodiment of the method according to the present invention, the unmodified mixed aluminum and silicon precursor is formed in situ by mixing in aqueous medium (i) one compound selected from the group consisting of aluminum salts, aluminum alkoxides and aluminum halogenoalkoxides and (ii) at least one compound selected from the group consisting of unmodified silicon alkoxides and chloroalkoxides. The alkoxide radical of the unmodified aluminum compound or silicon compound preferably contains 1 to 5 carbon atoms, such as methoxide, ethoxide, n-propoxide, or i-propoxide.

Preferably, an aluminum salt, such as a halide (e.g. chloride or bromide), a perhalogenate, a sulfate, a nitrate, a phosphate or a carboxylate, and at least one unmodified silicon alkoxide, such as tetramethyl or tetraethyl orthosilicate, is used.

A single unmodified silicon alkoxide or a mixture of unmodified silicon alkoxides, or a single unmodified silicon chloroalkoxide or a mixture of unmodified silicon chloroalkoxides, or a mixture of unmodified silicon alkoxides and chloroalkoxides can be used.

Preferably, an aluminum halide, such as chloride, and an unmodified silicon alkoxide is used. In practice, the mixture is made at ambient temperature between 15° C. and 35° C., preferably between 20° C. and 25° C., by adding the silicon alkoxide, pure or diluted in a co-solvent such as an alcohol, to the aluminum salt in aqueous solution, with stirring, until a clear homogeneous mixture is obtained. An unmodified mixed aluminum and silicon precursor is thus obtained. The stirring time varies from 10 to 180 minutes, and is preferably 120 minutes.

According to step a) of the method according to the invention, the precursor or an unmodified mixed aluminum and silicon alkoxide is put in contact with an aqueous alkali, the aluminum concentration being maintained at less than 0.3 mol/l, the Al/Si molar ratio being maintained between 1 and 3.6, and the alkali/Al molar ratio being maintained between 2.3 and 3. Advantageously, the aluminum concentration is between $1.5 \times 10^{-2}$ and 0.3 mol/l and even more preferably between $4.4 \times 10^{-2}$ and 0.3 mol/l. Preferably, the Al/Si molar ratio is between 1 and 2.

Preferably, an aqueous solution of sodium, potassium or lithium hydroxide, diethylamine or triethylamine with concentration between 0.5 M and 3 M, and preferably 3 M is used. The alkali can also be in the form of an hydroalcoholic solution.

The alkali is added to the precursor or to the unmodified mixed aluminum and silicon alkoxide at a rate preferably between 50 and 650 mmoles/hour.

According to the invention, the addition of the alkali in step a) is performed in the presence of silanol groups. These groups can be supplied by glass or silica (glass wool) particles or beads, which have superficial hydroxy groups. When the volume of liquid to be treated is large, it may be desirable to increase the quantity of beads. The diameter of the beads can be between 0.2 nm and 5 mm and preferably between 1 mm and 3 mm. To simplify the implementation of the method according to the invention, the preparation of the mixed aluminum and silicon precursor can also be performed in the presence of silanol groups, for example by circulating the mixture in a bed of glass beads.

After the addition of the alkali, step b) of the method according to the invention consists in string the mixture resulting from step a) at ambient temperature in the presence of silanol groups long enough to form the aluminosilicate polymer.

Then, step c) of the method according to the invention consists in eliminating from the reaction medium the byproducts formed during steps a) and b), such as the residual ions resulting essentially from the alkali used in step a). The residual ions can be eliminated by washing, by successive sedimentations or by diafiltration. The aluminosilicate polymer material according to the invention resulting from step c) can then be concentrated by centrifugation or nanofiltration.

In a first embodiment of the method according to the invention, during step a) a quantity of alkali is added in order to obtain an alkali/Al molar ratio of about 2.3. In this case the pH is maintained between 4 and 5, and preferably between 4.2 and 4.3. Then step b) as described above is applied. The aluminosilicate polymer material according to the present invention is thus obtained in dispersion form. Step c) to eliminate the residual ions can then be performed by diafiltration, followed by nanofiltration concentration.

In a second embodiment of the method according to the invention, during step a) a quantity of alkali is added to obtain an alkali/Al molar ratio of about 3. Then step b) as described above is applied. The aluminosilicate polymer material according to the present invention is thus obtained in suspension form. Step c) to eliminate the residual ions can then be performed by diafiltration, followed by nanofiltration concentration, the aluminosilicate polymer material having been previously redispersed by adding acid, such as hydrochloric or acetic acid or a mixture thereof. In a third embodiment, the method according to the invention comprises an additional step d), after step b) and before step c). Said step d) consists in adding in a few minutes an additional quantity of aqueous alkali to reach an alkali/Al molar ratio of 3 if this ratio had not already been reached during step a). The aluminosilicate polymer material according to the present invention is thus obtained in suspension form. Step c) to eliminate the residual ions can then be performed by diafiltration, followed by nanofiltration concentration, the aluminosilicate polymer material having been previously redispersed by adding hydrochloric acid. Step c) can also be performed by washing with osmosed water by successive sedimentations, followed by centrifugation concentration.

The aluminosilicate polymer material according to the present invention resulting from step c) followed by concentration has physical gel form. The Al/Si molar ratio is between 1 and 3.6. Subsequent lyophilization enables the aluminosilicate polymer according to the invention to be obtained in solid form.

In another embodiment, the method according to the invention comprises an additional step e), after step c), by which at least one chelating agent of aluminum is added to the aluminosilicate polymer resulting from step c). Then the mixture is stirred. Subsequent evacuation by vacuum enables the aluminosilicate polymer according to the invention to be obtained in solid form.

Said chelating agent of aluminum can be selected from the group consisting of carboxylic acids, phosphonic acids, sulfonic acids, difunctional acids, their ester and anhydride components and amino acids. Preferably, the chelating agent of aluminum is selected from the group consisting of HCOOH, $R_1COOH$ wherein $R_1$ is selected from the group consisting of $CH_3(CH_2)_n$, n being between to 0 and 12, $CF_3$, $C_6H_5$, $(C_6H_5)_2$, substituted aromatic rings as in salicylic acid, $C_4H_4S$; $R_2PO(OH)_2$ wherein $R_2$ is selected from the group consisting of $CH_3$, $C_6H_5$; $R_3SO_3H$ wherein $R_3$ is $CH_3(CH_2)_n$, n being between to 0 and 5; $HOOC(CH_2)_nCOOH$, n=0-8; aromatic difunctional acids as phtalic acid; $HOOC(CH_2)_nPO(OH)_2$, n=2, 4; hydroxy aliphatic acids; $HOOC(CH_2OH)_nCOOH$, n=1-2; $CH_3CH(NH_2)COOH$. Preferably, the chelating agent is acetic acid.

The useful solvent of chelating agent of aluminum is generally water but another solvent miscible to water can be used in order to solubilize the chelating agent before its adding to the aluminosilicate polymer resulting from step c). Step e) can comprise a first adding of acetic acid and a following adding of another different chelating agent of aluminum. This method is particularly useful to help the chelation when the chelating agent comprises large bulky groups.

The amount of chelating agent of aluminum corresponds to a molar ratio between chelating functions of the chelating agent and aluminum of the aluminosilicate polymer, which can be greater than 0.1. Preferably, the molar ratio is comprised between 0.1 and 10, and preferably between 0,1 and 4.

The introduction of a chelating agent of aluminium allows to modify the surface of the aluminosilicate polymer by forming a chelate compound. The functional group of the chelating agent allows to increase the affinity of the aluminosilicate polymer with the medium in which it is used.

The Raman spectrum of the aluminosilicate polymer material resulting from step e) comprises the same bands as the aluminosilicate polymer material resulting from step b), as well as bands corresponding to the chelating agent in its chelate form.

The aluminosilicate polymer material according to the present invention resulting from step e) has physical gel form. The Al/Si molar ratio is between 1 and 3.6.

The following examples illustrate the present invention without however limiting the scope.

EXAMPLE 1

Comparison

Imogolite, fibrous aluminosilicate polymer, was prepared according to the method described in Patent Application EP-A-1,112,959.

364.5 g $AlCl_3, 6H_2O$ (1.51 mole), then 127.7 g tetramethyl orthosilicate (0.84 mole) were added to 100 l of osmosed water. A transparent solution was obtained that was stirred for 30 minutes. The reaction mixture was circulated through a bed of glass beads 2 min diameter (Prolabo) using a pump with output 10 l/min. 3.461 NaOH 1M were added in at least two hours. The reaction medium became cloudy. It was stirred for three hours. The medium became clear. The pump was then disconnected. Then 1.063 l NaOH 1M were added. A white precipitate formed. This was left to settle overnight, and then the supernatant liquid was eliminated. About 30 liters of product remained. 0.6 l of a 50/50 by volume mixture of HCl, 1M and acetic acid, 2M was added to the precipitate. It was stirred for six hours. The mixture became clear and had a pH of 4.0. Then 146 liters of osmosed water were added. The final volume was 176 liters. The solution was ready for the maturation phase: the solution was left to stand in an inert plastic container (polypropylene) for ten days at ambient temperature (about 20° C.). Then, the mixture was heated to 96° C. while stirring for 24 hours in a stainless steel reactor. Then the reaction medium was concentrated by ultrafiltration using an Amicon 100 K membrane. An imogolite type fibrous aluminosilicate polymer was obtained, shown by electron diffraction. The Raman spectrum of this polymer is represented by FIG. 1.

In all the examples described, a Raman Bruker RFS 100 spectrometer (laser exciting wavelength, 1064 nm, power 800 mW, and 512 scans) was used to obtain the Raman spectra. The spectra were acquired in reflection mode (180°) using a lens with semi-cylindrical mirror. Samples were analyzed in solid form (obtained by lyophilization) without special preparation. Raman spectra instead of infrared spectra were preferred, because the materials according to the invention were water rich and the infrared spectrum of the material was then masked by the water. This problem does not appear with Raman spectra technology. Materials that have the same Raman signature belong to the same family.

EXAMPLE 2

Comparison

An aluminosilicate polymer in hollow sphere form was prepared according to the method described in Pat. U.S. Pat. No. 6,254,845.

Figure 2:
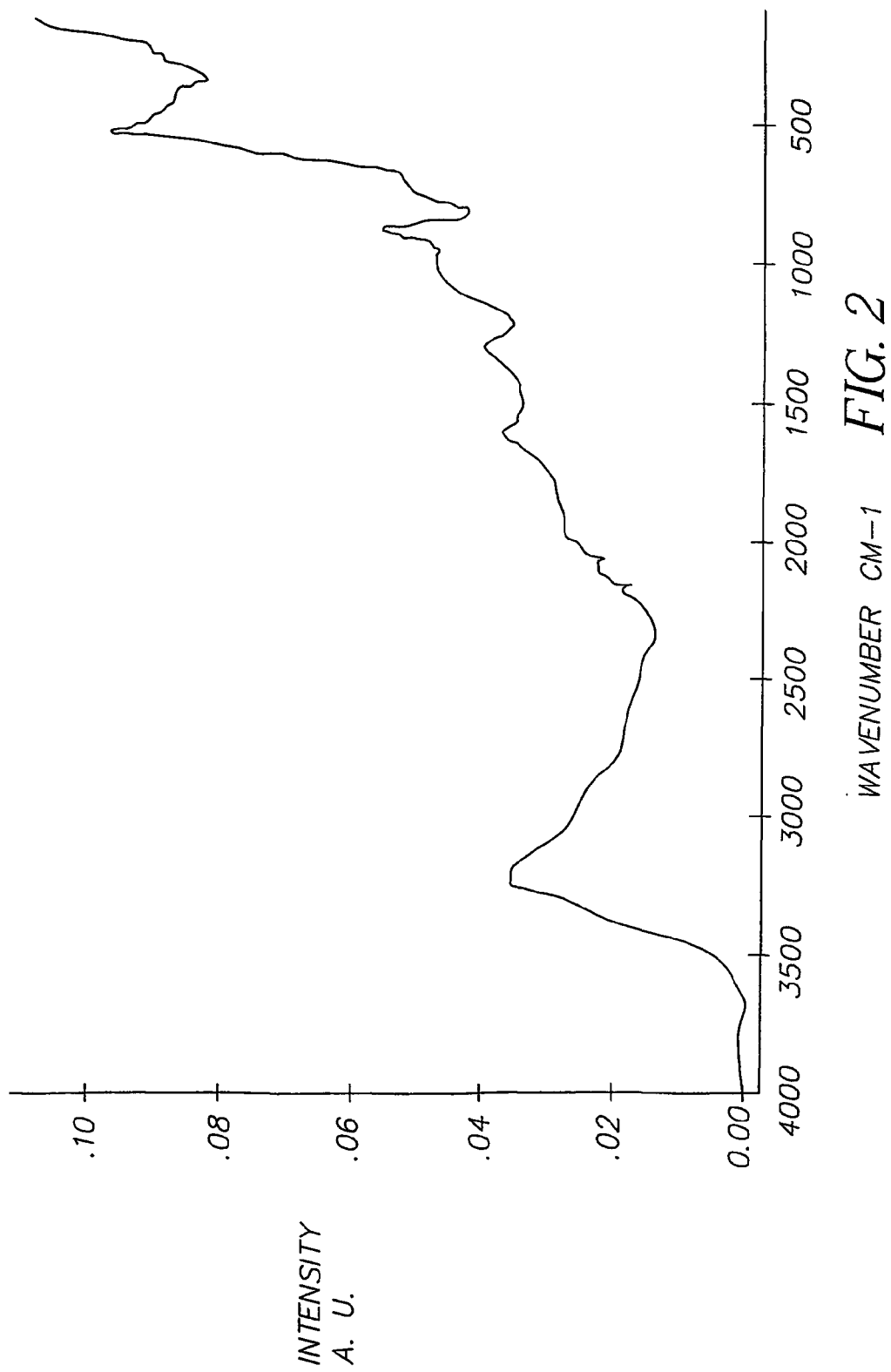

Sodium orthosilicate was dissolved in purified water to obtain 50 ml of an aqueous solution at 0.1 mol/l. Separately, aluminum chloride was dissolved in purified water to obtain 67.15 ml of an aqueous solution at 0.1 mol/l. The aluminum chloride solution was mixed at high speed with the aqueous solution of sodium orthosilicate. At this stage, the aluminum concentration was $5.7 \times 10^{-2}$ mol/l. The Al/Si molar ratio was 1.34. The mixture was stirred for one hour at ambient temperature. A suspension was obtained that was filtered using a membrane filter to eliminate byproducts such as sodium chloride. The retentate that adhered to the filter was recovered, and 120 ml of purified water was added to it. The mixture was dispersed using ultrasound for one hour and then warmed for five days at 80° C., washed with purified water, and dried in normal conditions of temperature and pressure. An aluminosilicate polymer was obtained in hollow spherical particle form. The Raman spectrum of this polymer is represented by FIG. 2.

EXAMPLE 3

Invention

Figure 3:
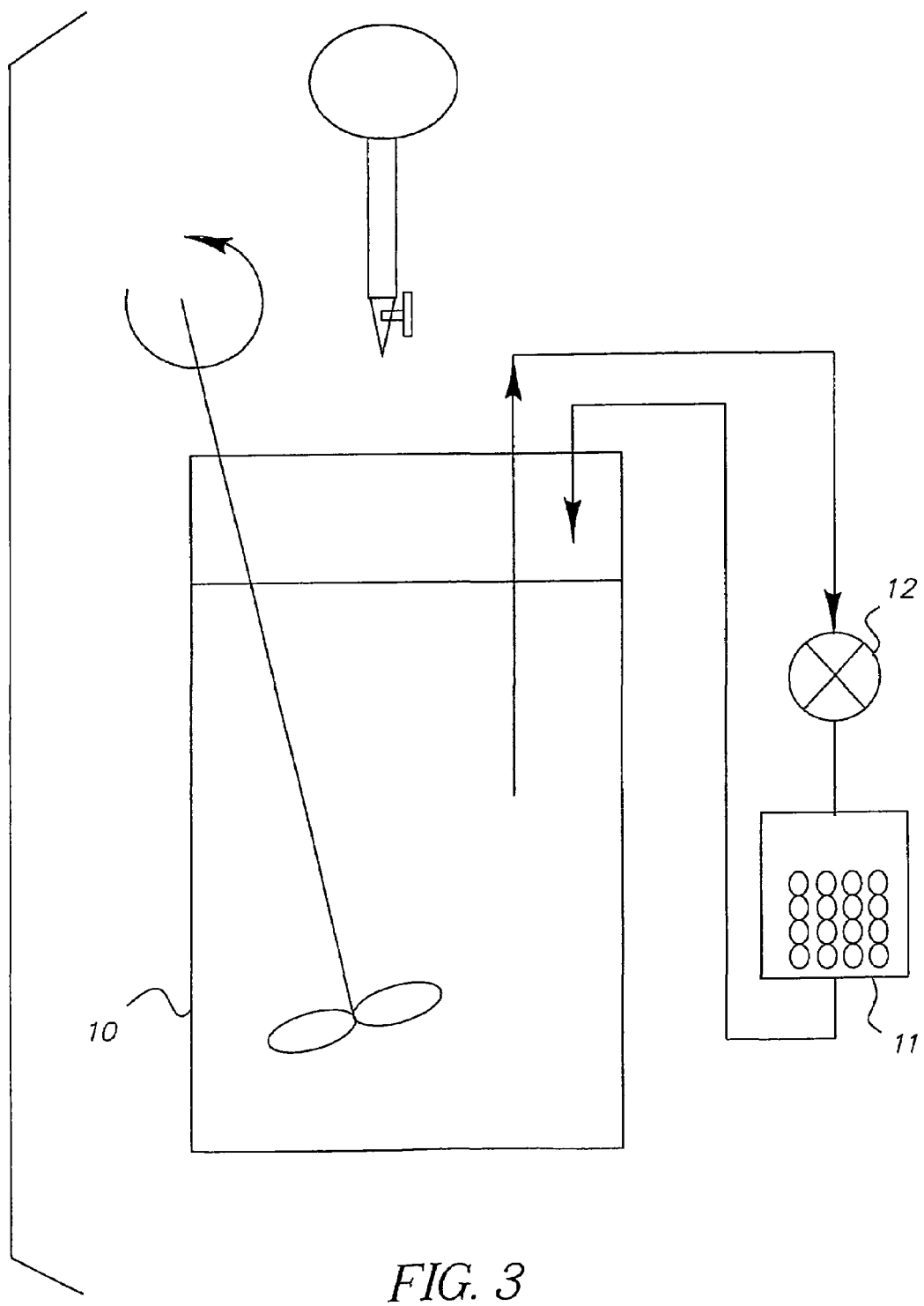
FIG. 3 represents diagrammatically a device for carrying out steps a) and b) of the method according to the invention.
Figure 4:
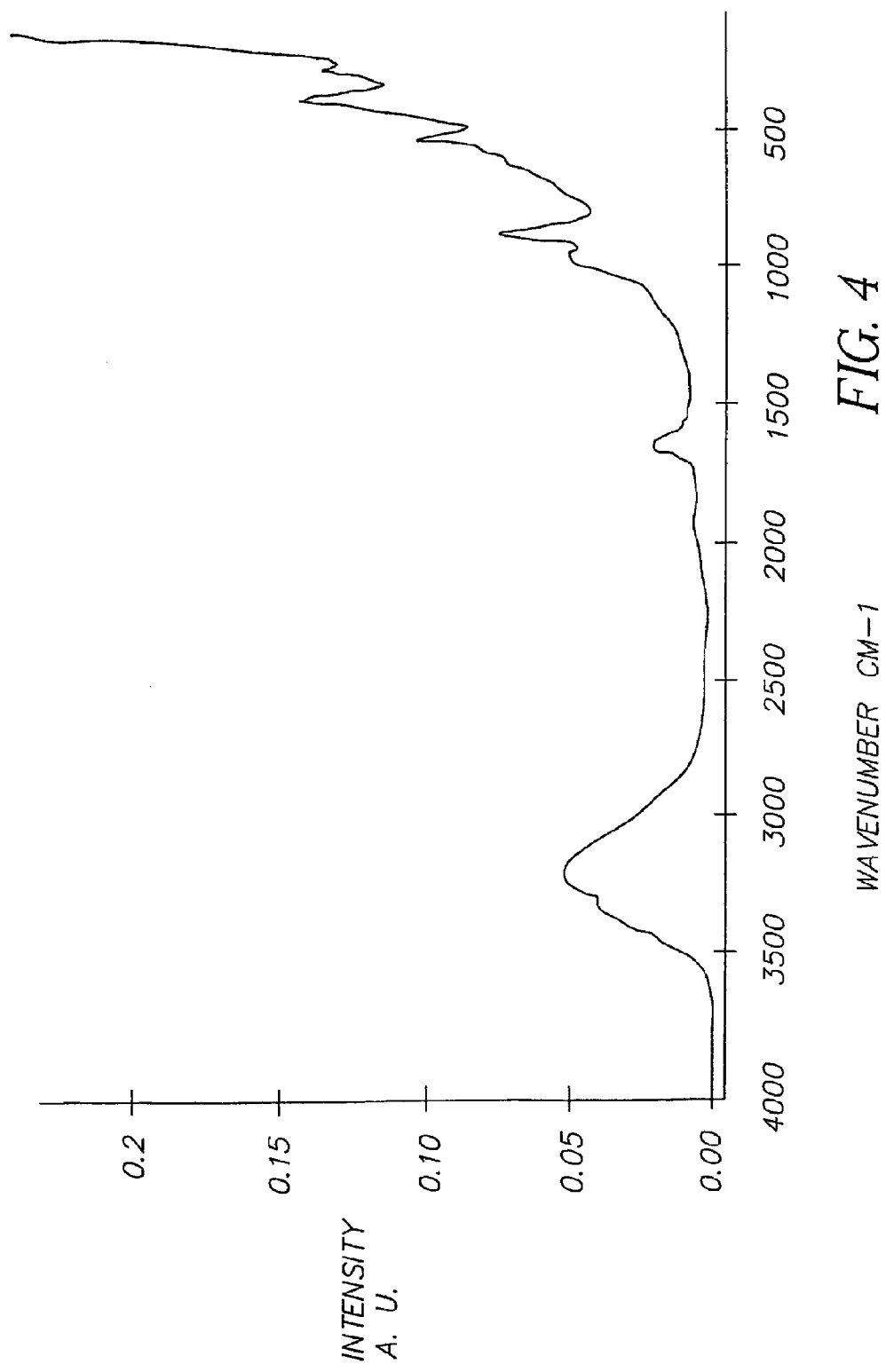
FIGS. 4 to 12 represent the spectra obtained by Raman spectroscopy of aluminosilicate polymers according to the present invention.

With reference to FIG. 3, 100 l of osmosed water were poured into a plastic (polypropylene) reactor (10). 4.53 moles $AlCl_3, 6H_2O$, then 2.52 moles tetraethyl orthosilicate were added. This mixture was stirred and circulated simultaneously through a bed formed of 1 kg of glass beads (11) 2-mm diameter using a pump (12) with 8-l/min output. The operation to prepare the unmodified mixed aluminum and silicon precursor took 90 minutes. Then, according to step a) of the method according to the invention, 10.5 moles NaOH 3M were added to the contents of the reactor (10) in two hours. Aluminum concentration was $4.4 \times 10^{-2}$ mol/l, Al/Si molar ratio 1.8 and alkali/Al ratio 2.31. The reaction medium clouded. According to step b) of the method according to the invention, the mixture was stirred for 48 hours. The medium became clear. The circulation was stopped in the glass bead bed. The aluminosilicate polymer material according to the present invention was thus obtained in dispersion form. FIG. 4 represents the Raman spectrum of this polymer that was lyophilized to obtain its Raman signature. Step c) of the method according to the invention consisted in performing pre-concentration by a factor of 3 by nanofiltration, then diafiltration using a Fihntec NF 2540 nanofiltration membrane (surface area 6 $m^2$) to eliminate the sodium salts to obtain an Al/Na ratio greater than 100. The retentate resulting from the diafiltration by nanofiltration was concentrated to obtain a gel with about 20% by weight of aluminosilicate polymer according to the invention.

Example 3 was repeated replacing tetraethyl orthosilicate by tetramethyl orthosilicate. The same Raman spectrum was obtained as that of FIG. 4.

EXAMPLE 4

Figure 5:
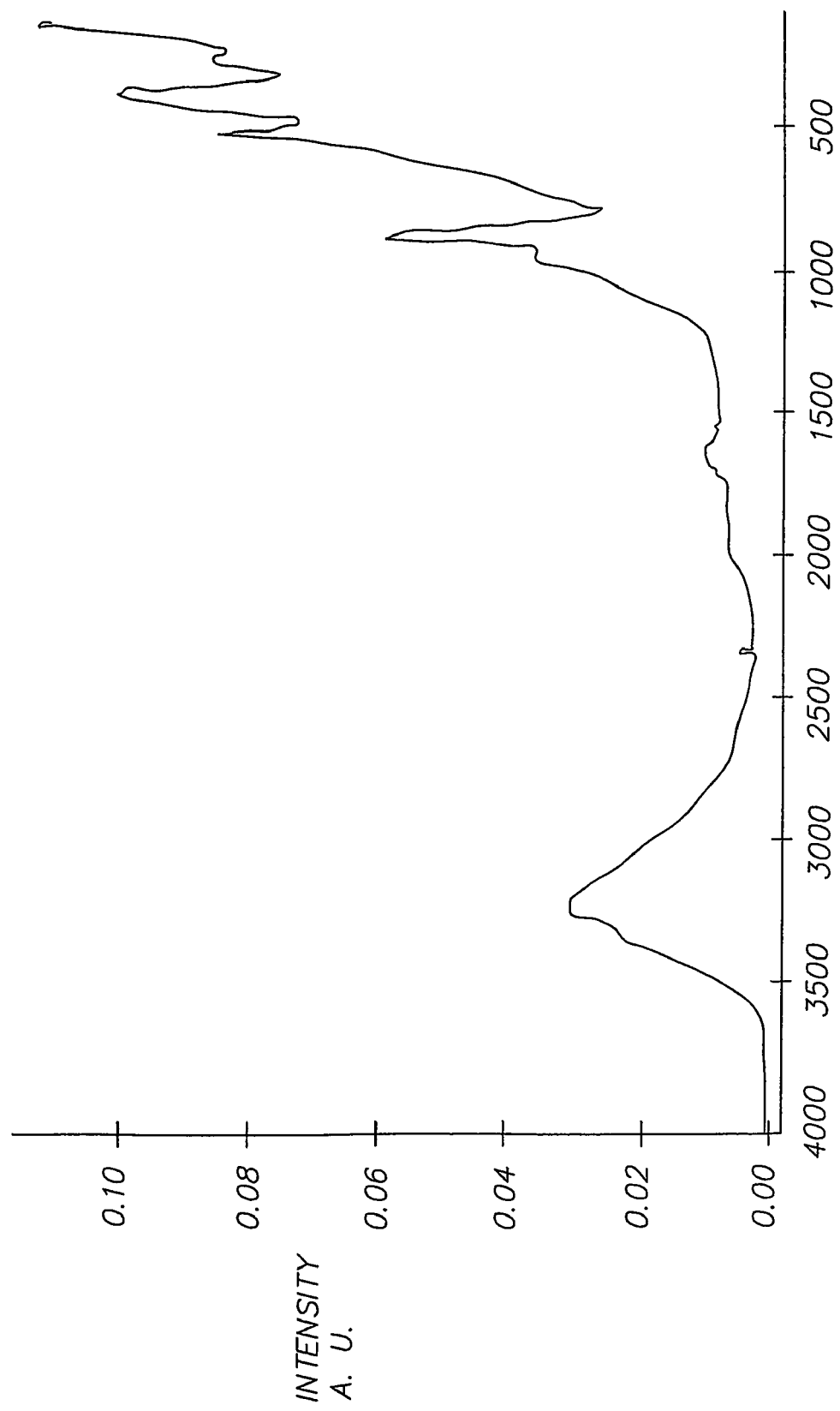

Invention 20 moles $AlCl_3, 6H_2O$, then 4.5 kg glass beads 2-mm diameter, then 11.1 moles tetraethyl orthosilicate were added to 100 l osmosed water. This mixture was stirred vigorously. The operation to prepare the unmodified mixed aluminum and silicon precursor took 30 minutes to obtain a clear homogeneous medium. Then, according to step a) of the method according to the invention, 60 moles NaOH dissolved in 100 liters of osmosed water were added to the reaction medium in 30 minutes. The reaction medium clouded. Aluminum concentration was 0.1 mol/l, Al Si molar ratio 1.8 and alkali/Al ratio 3. According to step b) of the method according to the invention, the mixture was stirred for 15 minutes. The aluminosilicate polymer material according to the present invention was thus obtained in suspension form. FIG. 5 represents the Raman spectrum of this polymer that was lyophilized to obtain its Raman signature. Step c) of the method according to the invention consisted in adding 930 g HCl 37% previously diluted 10 times and stirring for 150 minutes to obtain a dispersion of the aluminosilicate polymer according to the invention. The dispersion was then diafiltrated using a Filmtec NF 2540 nanofiltration membrane (surface area 6 $m^2$) to eliminate the sodium salts to obtain an Al/Na ratio greater than 100. The retentate resulting from the diafiltration by nanofiltration was concentrated to obtain a gel with about 20% by weight of aluminosilicate polymer according to the invention.

EXAMPLE 5

Figure 6:
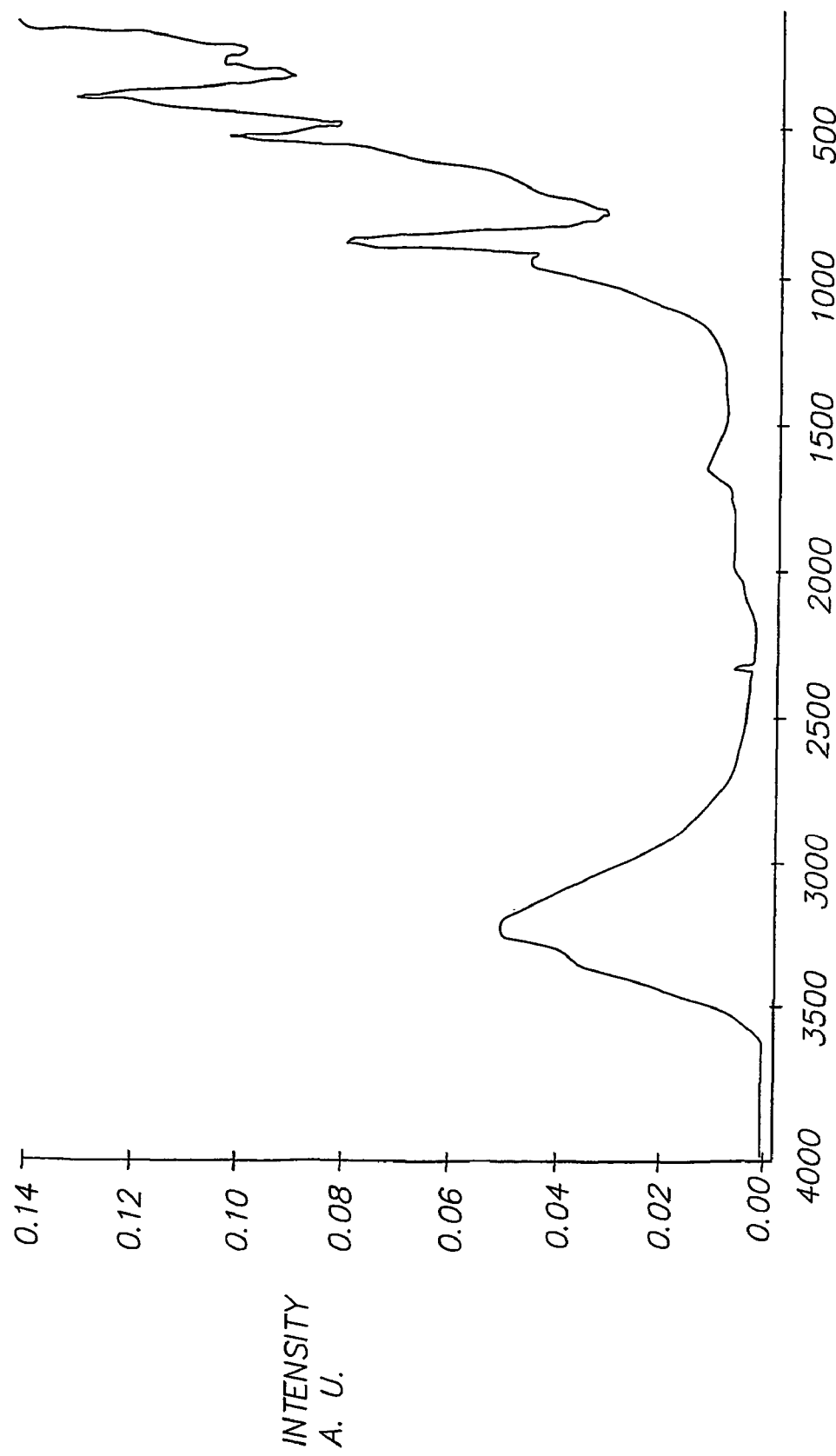

Invention 4.53 moles $AMCl_3$, $6H_2O$, then 2.52 moles tetraethyl orthosilicate were added to 100 l osmosed water. This mixture was stirred and circulated simultaneously through a bed formed of 1-kg glass beads 2-mm diameter using a pump with 8-1/min output. The operation to prepare the unmodified mixed aluminum and silicon precursor took 120 minutes. Then, according to step a) of the method according to the invention, 10.5 moles NaOH 3M were added to the precursor in two hours. The reaction medium clouded. According to step b) of the method according to the invention, the mixture was stirred for 15-20 hours. The medium became clear. The circulation was stopped in the glass bead bed. Then, according to step d) of the method according to the invention, 3.09 moles NaOH 3M were added in ten minutes. Aluminum concentration was $4.4 \times 10^{-2}$ mol/l, Al/Si molar ratio 1.8 and alkal/Al ratio 3. The aluminosilicate polymer material according to the present invention was thus obtained in suspension form. FIG. 6 represents the Raman spectrum of this polymer that was lyophilized to obtain its Raman signature. Step c) of the method according to the invention consisted in leaving the polymer suspension to settle for 24 hours, then in discarding the supernatant to recover the sediment. This sediment was washed with osmosed water by successive sedimentations to obtain a sodium level in the supernatant less than 10 ppm. Then the sediment was centrifuged to obtain a gel with about 4% by weight of aluminosilicate polymer according to the invention. The resulting gel was lyophilized (20 mT, −50° C.) to obtain a solid of constant mass. The aluminosilicate polymer material according to the invention was thus obtained in powder form. The powder can be redispersed by adding water and acid, such as hydrochloric or acetic acid, and with mechanical stirring.

EXAMPLE 6

Invention

The procedure of example 5 was repeated, except that step c) of the method according to the invention consisted in leaving the resulting polymer suspension to settle for 24 hours, then in discarding the supernatant to recover the sediment. Then 166 g HCl 37%, previously diluted 10 times, were added to the sediment to obtain a dispersion of the aluminosilicate polymer according to the invention. The dispersion was then diafiltrated using a Filmtec NF 2540 nanofiltration membrane (surface area 6 m²) to eliminate the sodium salts to achieve an Al/Na ratio greater than 100. Then the retentate resulting from the diafiltration by nanofiltration was concentrated to obtain a gel with about 20% by weight of aluminosilicate polymer according to the invention. The resulting gel was lyophilized (20 mT, −50° C.) to achieve a solid of constant mass. The aluminosilicate polymer material according to the invention was thus obtained in powder form. The powder can be redispersed by adding water and acid, such as hydrochloric or acetic acid, and with mechanical stirring.

EXAMPLE 7

Invention 1.56 moles $AlCl_3$, $6H_2O$, then 0.84 moles tetramethyl orthosilicate were added to 100 l osmosed water. This mixture was stirred and circulated simultaneously through a bed formed of 1-kg glass beads 2-mm diameter using a pump with 8-1/min output. The operation to prepare the unmodified mixed aluminum and silicon precursor took 120 minutes. Then, according to step a) of the method according to the invention, 3.5 moles NaOH 1M were added to the precursor in two hours. The reaction medium clouded. According to step b) of the method according to the invention, the mixture was stirred for 15-20 hours. The medium became clear. The circulation was stopped in the glass bead bed. Then, according to step d) of the method according to the invention, 1.06 moles NaOH 1M were added in ten minutes. Aluminum concentration was $1.5 \times 10^{-2}$ mol/l, Al/Si molar ratio 1.8 and alkali/Al ratio 2.9. The aluminosilicate polymer material according to the present invention was thus obtained in suspension form. Step c) of the method according to the invention consisted in leaving the polymer suspension to settle for 24 hours, then discarding the supernatant to recover the sediment. This sediment was washed with osmosed water by successive sedimentations to obtain a sodium level in the supernatant less than 10 ppm. Then the sediment was centrifuged to obtain a gel with about 4% by weight of aluminosilicate polymer according to the invention. The resulting gel was lyophilized (20 mT, −50° C.) to achieve a solid of constant mass. The aluminosilicate polymer material according to the present invention was thus obtained in powder form. The powder redispersed by adding water and acid, such as hydrochloric or acetic acid, and with mechanical stirring.

EXAMPLE 8

Invention 31.3 moles $AlC_3$, $6H_2O$, then 16.79 moles tetraethyl orthosilicate were added to 100 l osmosed water. This mixture was stirred and circulated simultaneously through a bed formed of 1-kg glass beads 2-mm diameter using a pump with 8-1/min output. The operation to prepare the unmodified mixed aluminum and silicon precursor took 120 minutes. Then, according to step a) of the method according to the invention, 70 moles NaOH 20M were added to the precursor in two hours. The reaction medium clouded. According to step b) of the method according to the invention, the mixture was stirred for 15-20 hours. The medium became clear. The circulation was stopped in the glass bead bed. Then, according to step d) of the method according to the invention, 21.5 moles NaOH 20M were added in ten minutes. Aluminum concentration was 0.3 mol/l, Al/Si molar ratio 1.9 and alkali/Al ratio 2.9. The aluminosilicate polymer material according to the present invention was thus obtained in suspension form. Step c) of the method according to the invention consisted in leaving the polymer suspension to settle for 24 hours, then in discarding the supernatant to recover the sediment. This sediment was washed with osmosed water by successive sedimentations to obtain a sodium level in the supernatant less than 10 ppm. Then the sediment was centrifuged to obtain a gel with about 4% by weight of aluminosilicate polymer according to the invention. The resulting gel was lyophilized (20 mT, −50° C.)

to achieve a solid of constant mass. The aluminosilicate polymer material according to the present invention was thus obtained in powder form. The powder can be redispersed by adding water and acid, such as hydrochloric or acetic acid, and with mechanical stirring.

EXAMPLE 9

Figure 7:
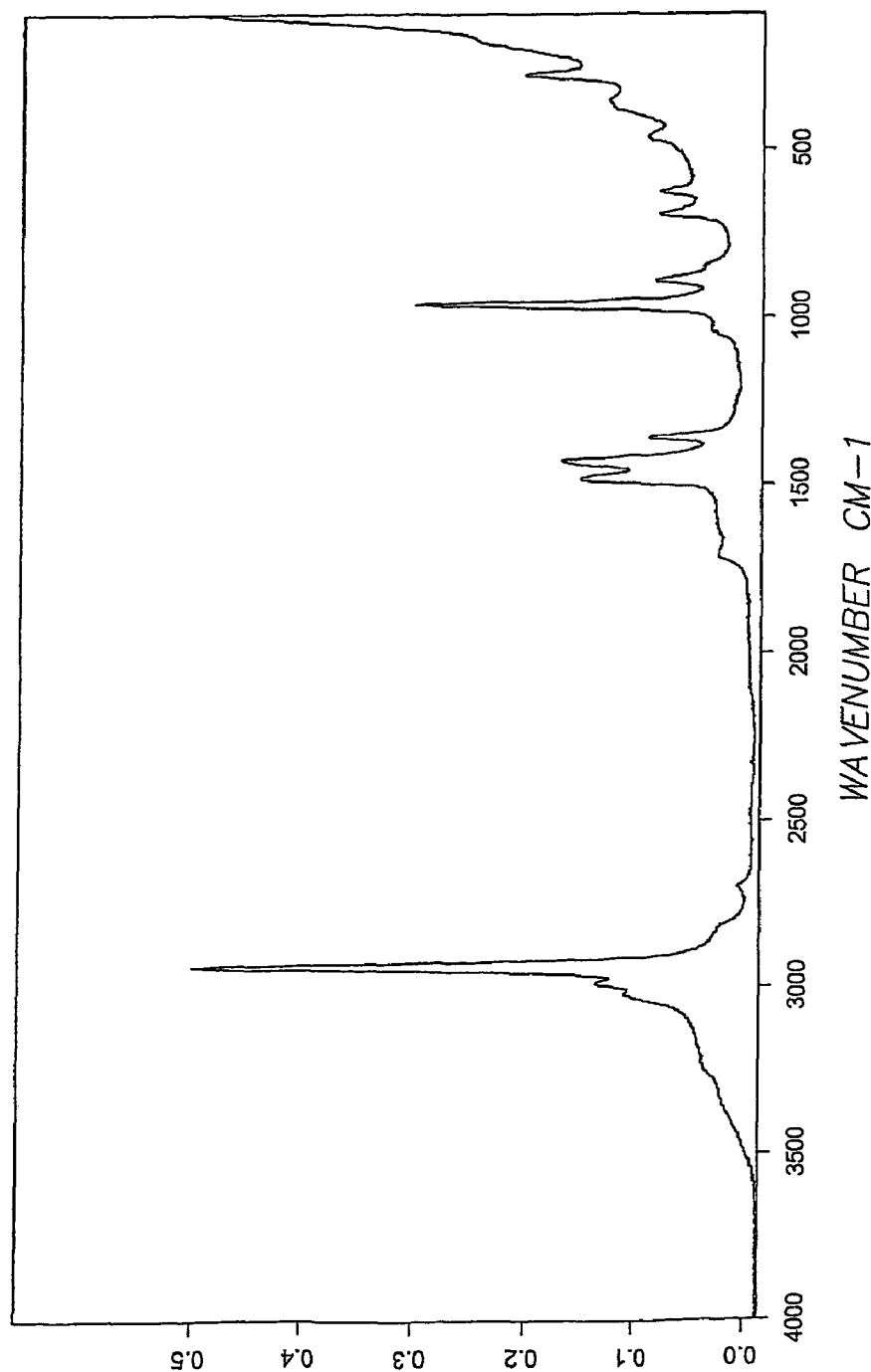

Invention 100 g of gel of aluminosilicate polymer obtained in Example 6 (Al amount=1,54 g, 57 mmol, measured by inductively coupled plasma atomic emission spectroscopy, ICP) was diluted with 100 g of osmosed water. Glacial acetic acid (6.8 g, 114 mmol) was added to the gel. The mixture was stirred during 2 days. The excess of water and the unreacted acetic acid were removed by evacuation under vaccum at 35° C. 11.1 g of a white powder was obtained. The Raman spectrum of this aluminosilicate polymer material according to the invention is represented by FIG. 7. The Raman spectrum comprises the bands of the aluminosilicate polymer obtained in Example 6, as well as the bands corresponding to the chelating agent in its acetate form.

EXAMPLE 10

Invention

Figure 8:
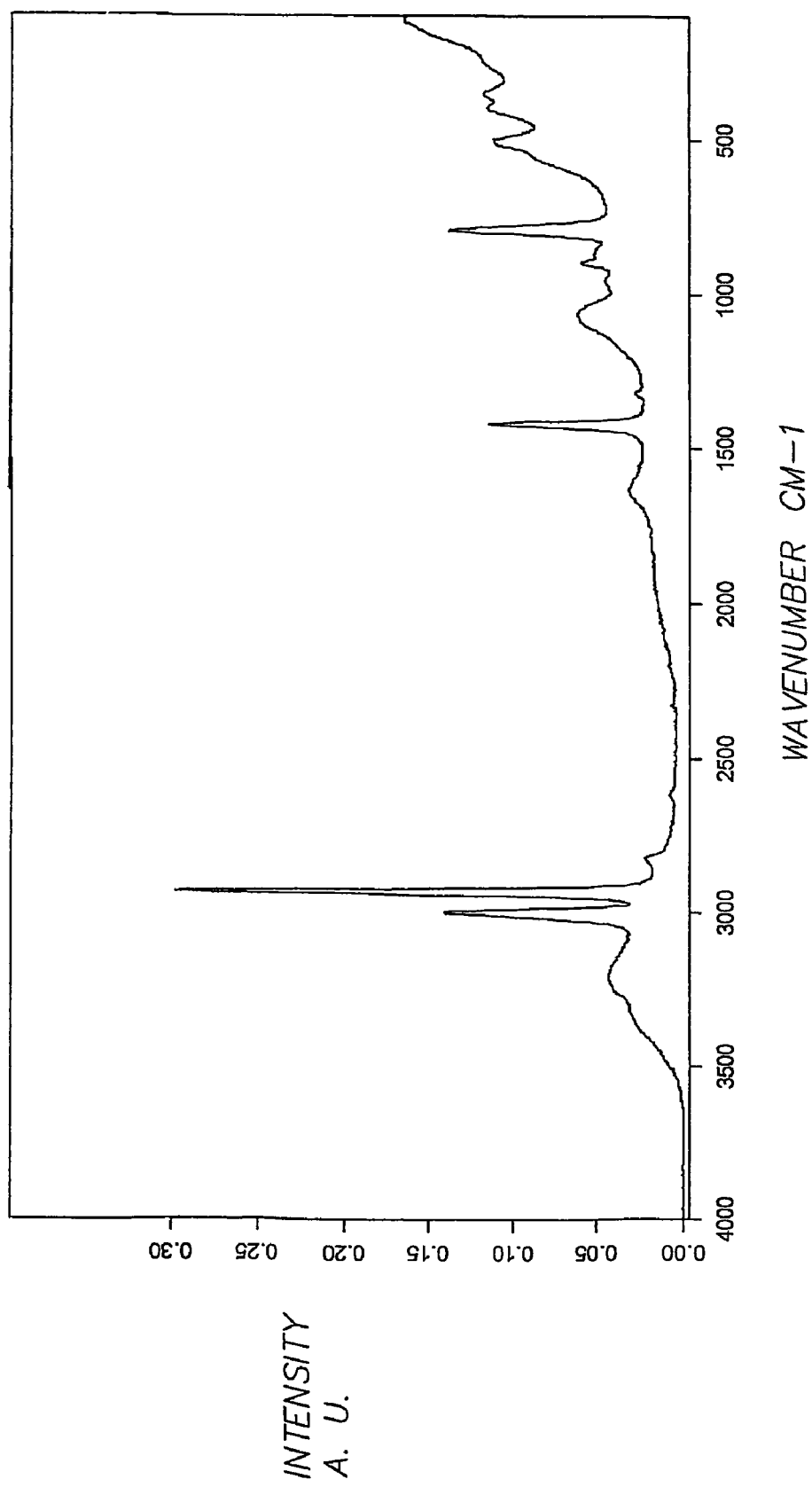

Methyl phosphonic acid powder (1.7 g, 10.4 mmol) was solubilized in ethanol (10 ml). 40 g of gel of aluminosilicate polymer (Al amount=0.950 g, 35 mmol) obtained in Example 6 diluted with 20 g of osmosed water were added to the alcoholic solution of methyl phosphonic acid. The mixture was stirred during 4 days. The excess of ethanol was removed by evacuation under vacuum at 35° C. A white powder was obtained. The Raman spectrum of this aluminosilicate polymer material according to the invention is represented by FIG. 8. The Raman spectrum comprises the bands of the aluminosilicate polymer obtained in Example 6, as well as the bands corresponding to the chelating agent in its phosphonate form.

EXAMPLE 11

Figure 9:
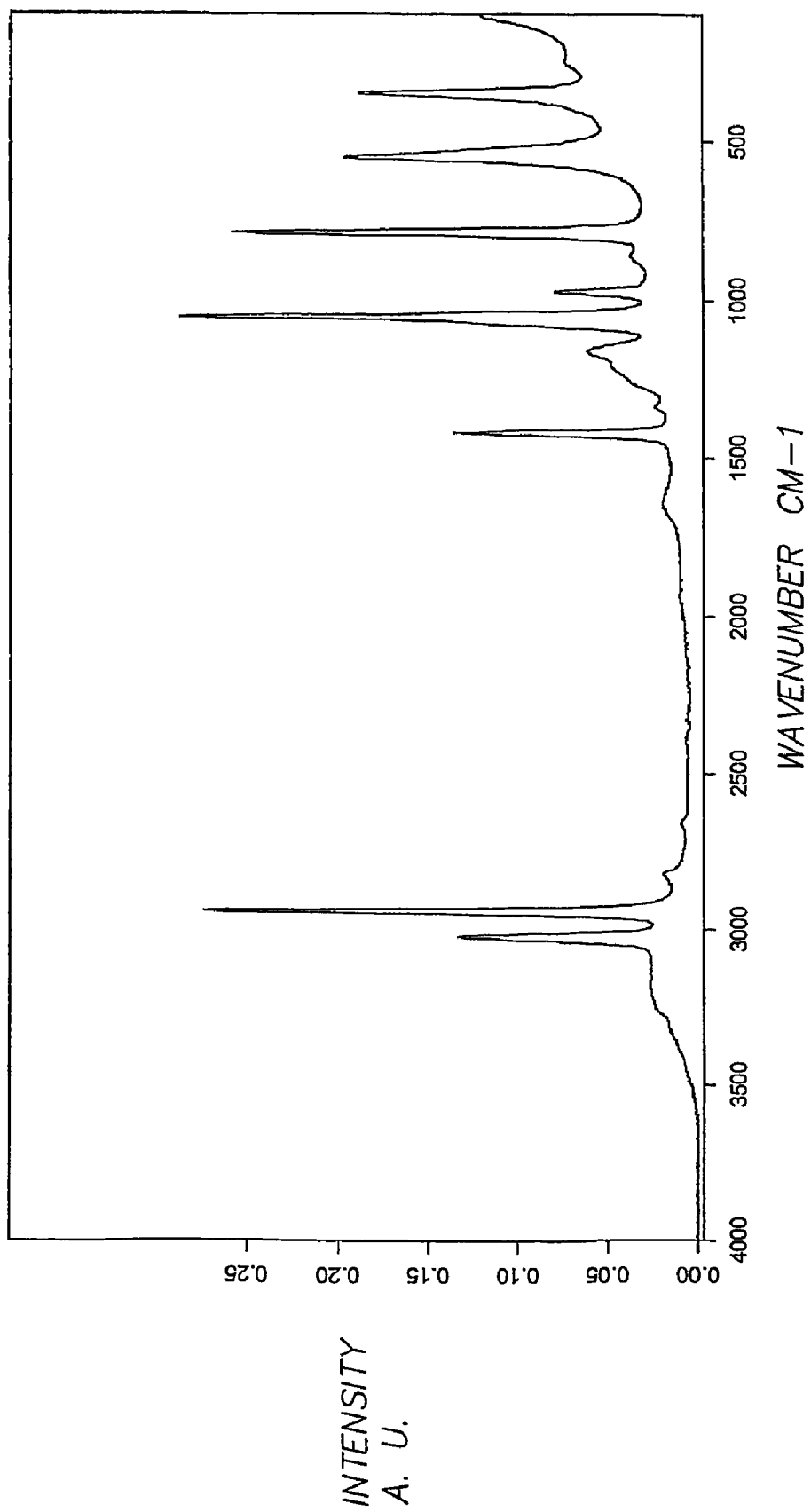

Invention 20 g of gel of aluminosilicate polymer (Al amount=0.8 g, 29 mmol) obtained in Example 6 was diluted with 20 g of osmosed water. Methyl sulfonic acid (1.6 g, 16.6 mmol) was added to the gel. The mixture was stirred during 4 days. The excess of water was removed by evacuation under vacuum at 35° C. A white powder was obtained. The Raman spectrum of this aluminosilicate polymer material according to the invention is represented by FIG. 9. The Raman spectrum comprises the bands of the aluminosilicate polymer obtained in Example 6, as well as the bands corresponding to the chelating agent in its sulfonate form.

EXAMPLE 12

Invention

Figure 10:
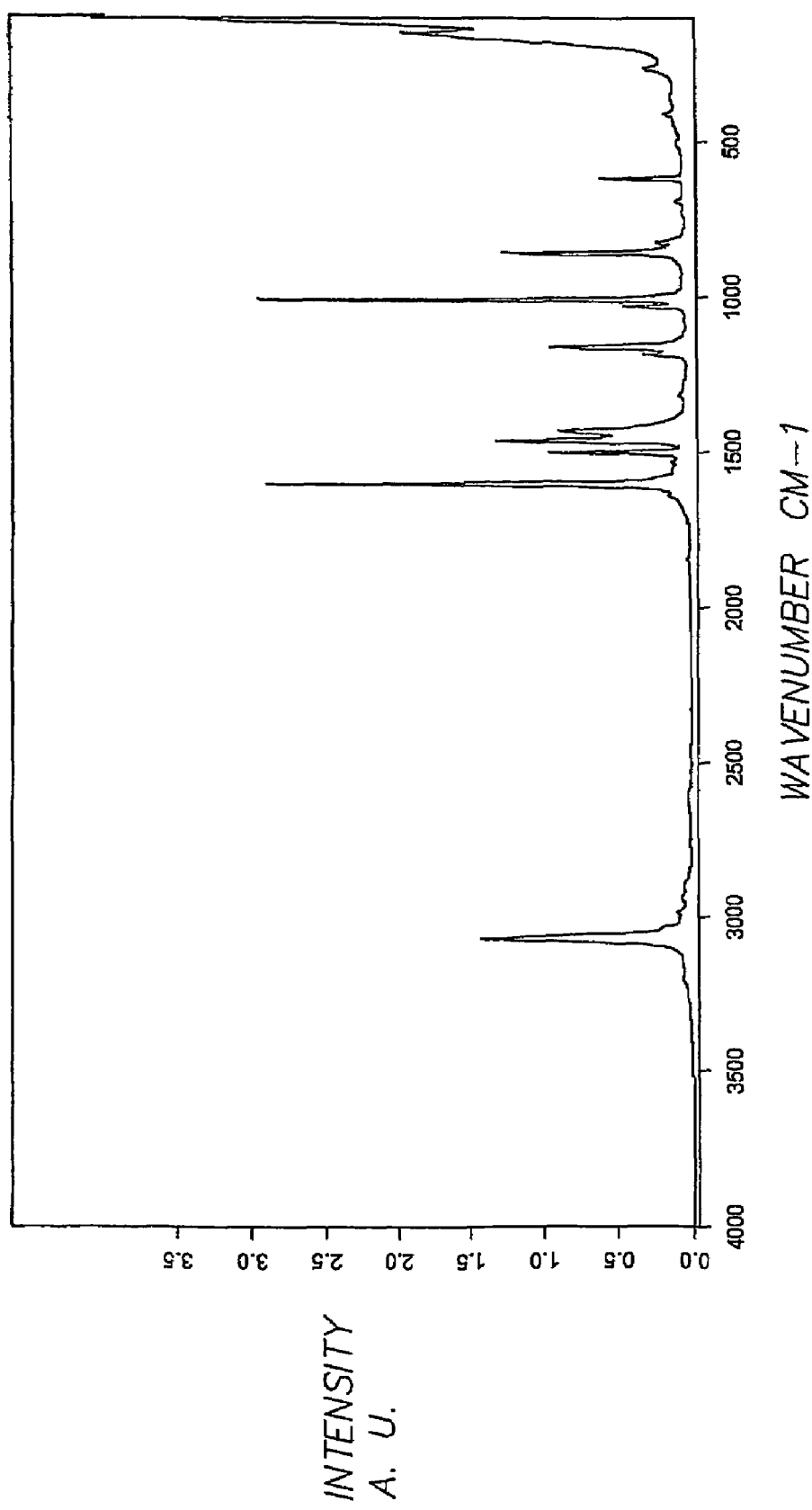

Benzoic acid powder (0.85 g, 7 mmol) was solubilized in 40 ml of ethanol then 40 g of the aluminosilicate polymer gel (Al amount=0.97 g, 36 mmol) obtained in Example 6 diluted in 20 ml osmosed water was added to the alcoholic solution. The mixture was stirred during 3 days. The excess of ethanol and water was removed under vacuum at 35° C. A white powder is obtained. The Raman spectrum of this aluminosilicate polymer material according to the invention is represented by FIG. 10. The Raman spectrum comprises the bands of the aluminosilicate polymer obtained in Example 6, as well as the bands corresponding to the chelating agent in its benzoate form.

EXAMPLE 13

Invention

Figure 11:
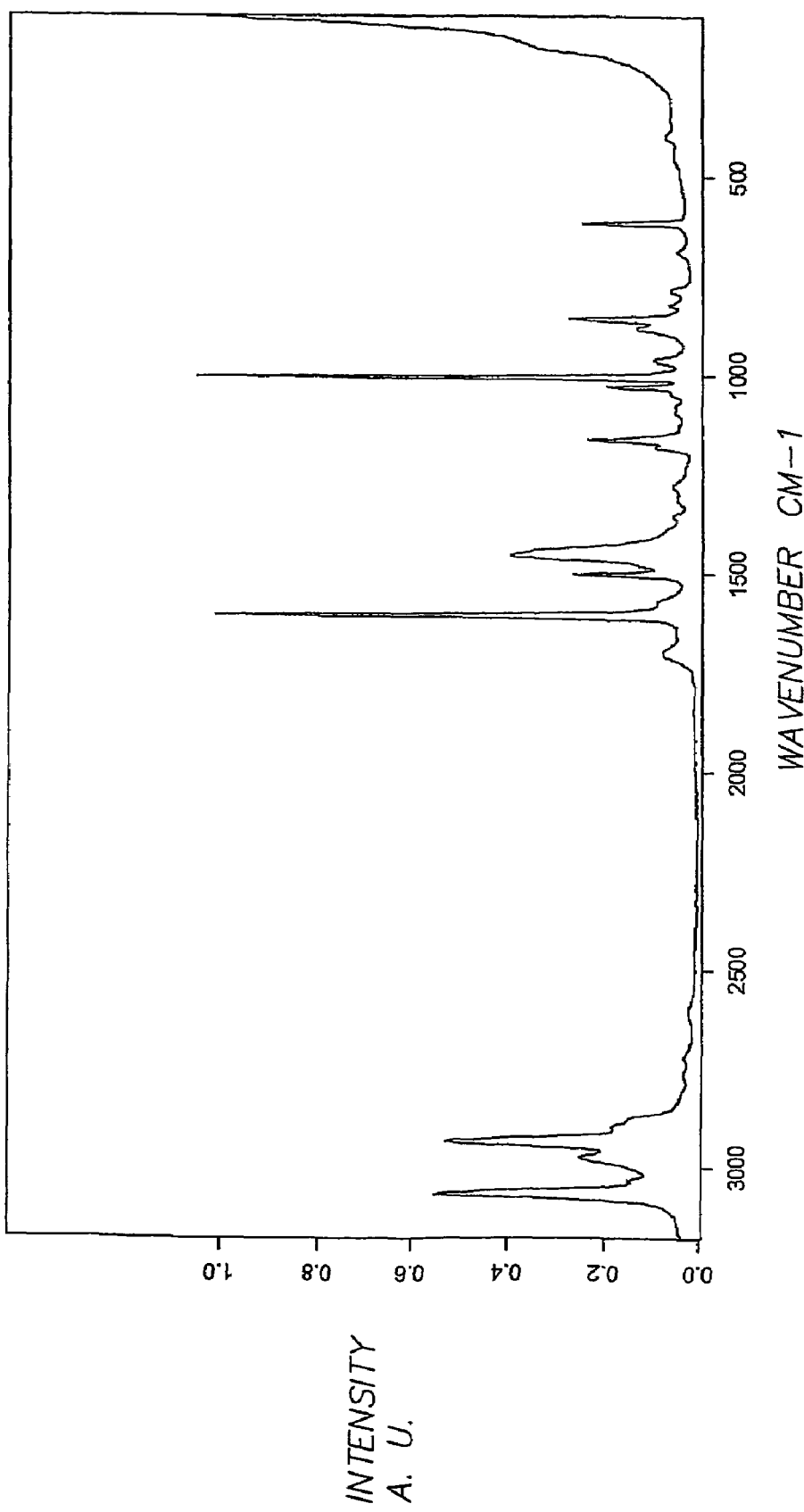

Benzoic acid powder (0.3 g, 2.5 mmol) was solubilized in 10 ml of ethanol then 1 g of the aluminosilicate polymer modified with acetic acid described in example 9 (Al amount=0,13 g, 5.1 mmol) was added to the alcoholic solution. The mixture was stirred during 3 days. The excess of ethanol was removed under vacuum at 35° C. A white powder is obtained. The Raman spectrum of this aluminosilicate polymer material according to the invention is represented by FIG. 11. The Raman spectrum comprises the bands of the aluminosilicate polymer obtained in Example 6, as well as the bands corresponding to the chelating agent in its benzoate form and in its residual acetate form.

EXAMPLE 14

Figure 12:
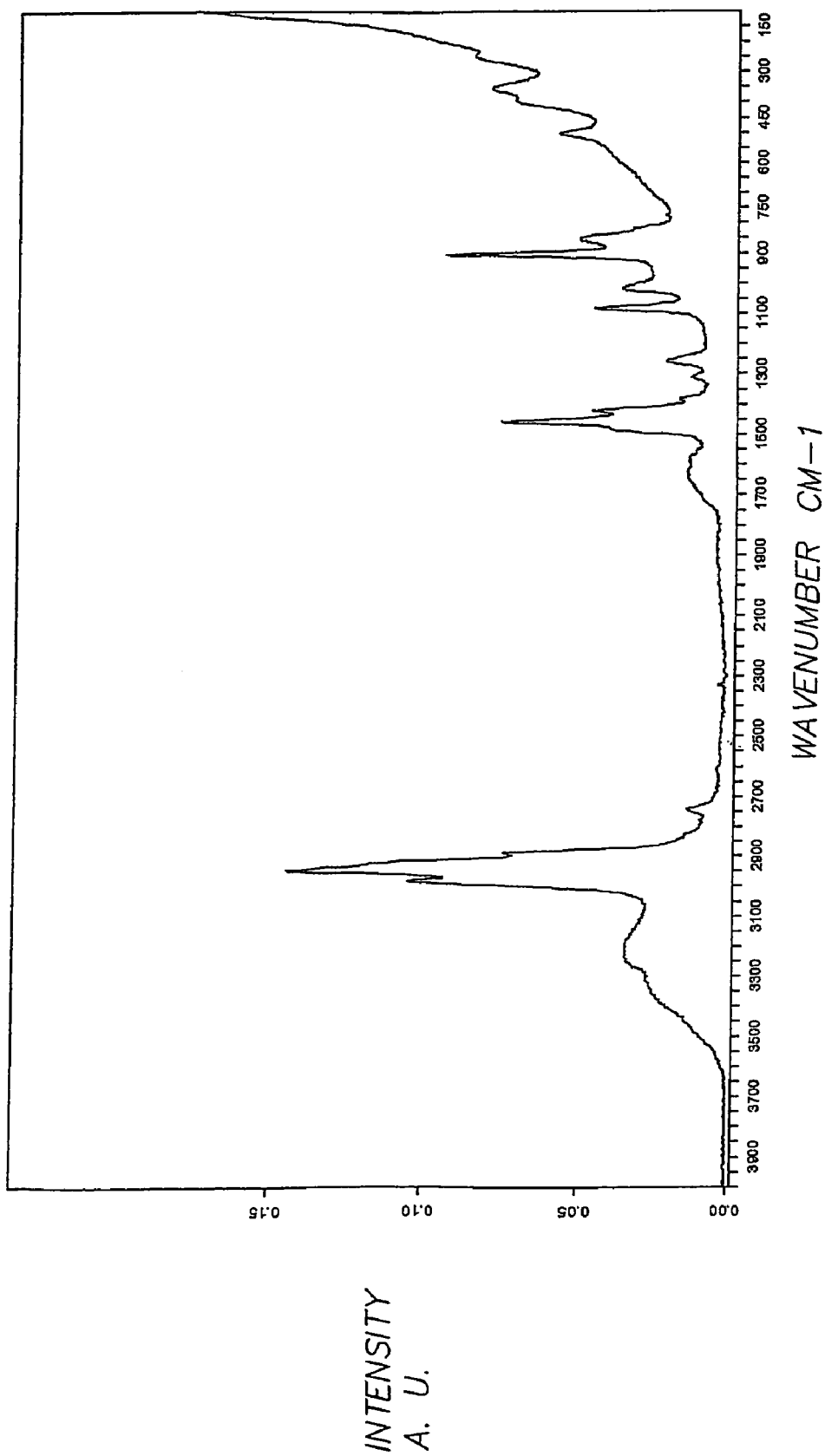

Invention 100 g of gel of aluminosilicate polymer obtained in Example 6 (Al amount=1,54 g, 57 mmol) was diluted with 100 g of osmosed water. Propionic acid (2.0 g, 27.7 mmol) was added to the gel. The mixture was stirred during 2 days. The excess of water and the unreacted acetic acid were removed by evacuation under vacuum at 35° C. A white powder was obtained. The Raman spectrum of this aluminosilicate polymer material according to the invention is represented by FIG. 12. The Raman spectrum comprises the bands of the aluminosilicate polymer obtained in Example 6, as well as the bands corresponding to the chelating agent in its propionate form.

The invention claimed is:

1. A method for preparing an aluminosilicate polymer, comprising the following steps:
   a) treating a mixed aluminum and silicon alkoxide only comprising hydrolyzable functions, or a mixed aluminum and silicon precursor resulting from the hydrolysis of a mixture of aluminum compounds and silicon compounds only comprising hydrolyzable functions, with an aqueous alkali, in the presence of silanol groups, the aluminum concentration being maintained at between $1.5 \times 10^{-2}$ and 0.3 mol/l, the AL/Si molar ratio being maintained between 1 and 3.6 and the alkali/Al molar ratio being maintained between 2.3 and 3;
   (b) stirring the mixture resulting from step a) at ambient temperature of between 15° C. and 35° C. in the presence of silanol groups long enough to form the aluminosilicate polymer; and directly after step (b)
   (c) eliminating the byproducts formed during steps a) and b) from the reaction medium.

2. The method according to claim 1, wherein the alkali of step a) is selected from among the group consisting of sodium, potassium, and lithium hydroxide, diethylamine and triethylamine.

3. The method according to claim 1, wherein the silanol groups are supplied in silica or glass bead form.

4. The method according to claim 3, wherein the silica or glass beads have a diameter between 0.2 mm and 5 mm.

5. The method according to claim 1, wherein the aluminum concentration is maintained between $4.4 \times 10^{-2}$ and 0.3 mol/l.

6. The method according to claim 1, wherein said alkali/Al molar ratio is about 2.3.

7. The method according to claim 1, wherein said alkali/Al molar ratio is about 3.

8. The method according to claim 1, wherein the mixed aluminum and silicon precursor resulted from hydrolysis of a mixture of aluminum compounds and silicon compounds only having hydrolyzable functions is a product resulting from the mixture in an aqueous medium (i) of a compound selected from the group consisting of aluminum salts, aluminum alkoxides and aluminum halogenoalkoxides and (ii) at least one compound selected from the group consisting of silicon alkoxides and chloroalkoxides only having hydrolyzable functions.

9. The method according to claim 8, wherein the mixed aluminum and silicon precursor is the product resulting from the mixture (i) of an aluminum halide and (ii) a silicon alkoxide only having hydrolyzable functions.

10. The method according to claim 9, wherein said silicon alkoxide only having hydrolyzable functions is tetraethyl orthosilicate or tetraethyl orthosilicate.

11. The method according to claim 1, comprising, after step c) a step d), by which at least one acid modifying agent of aluminum is added to the aluminosilicate polymer resulting from step c) wherein the acid modifying agent allows the modification of the surface of the aluminosilicate polymer.

12. The method according to claim 11, wherein said acid modifying agent of aluminum is selected from group consisting of carboxylic acids, phosphonic acids, sulfonic acids, difunctional acids, their ester and anhydride components and amino acids.

13. The method according to claim 12, wherein said acid modifying agent of aluminum is selected from the group consisting of HCOOH, $R_1$COOH wherein $R_1$ is selected from the group consisting of $CH_3(CH_2)_n$, n being between 0 and 12, $CF_3$, $C_6H_5$, $(C_6H_5)_2$, substituted aromatic rings, $C_4H_4S$; $R_2PO(OH)_2$ wherein $R_2$ is selected from the group consisting of $CH_3$, $C_6H_5$; $R_3SO_3H$ wherein $R_3$ is $CH_3(CH_2)_n$, n being between 0 and 5; $HOOC(CH_2)_nCOOH$, n=0-8; aromatic difunctional acids; $HOOC(CH_2)_nPO(OH)_2$, n=2, 4; hydroxyl aliphatic acids; $HOOC(CH_2OH)_nCOOH$, n=1-2; $CH_3CH(NH_2)COOH$.

14. The method according to claim 11, wherein step e) comprises a first adding of acetic acid and a following adding of another different acid modifying agent of aluminum.

15. The method according to claim 11, wherein the amount of acid modifying of aluminum corresponds to a molar ration between chelating functions of the chelating agent and aluminum of the aluminosilicate polymer comprised between 0.1 and 10.

16. The method according to claim 1 wherein the hybrid aluminusilicate polymer is characterized in that its Raman spectrum comprises in spectral region 200-600 $cm^{-1}$ a wide band at $250\pm6$ $cm_{-1}$, a wide intense band at $359\pm6$ $cm^{-1}$, a shoulder at $407\pm7$ $cm^{-1}$, and a wide band at $501\pm6$ $cm^{-1}$, the Raman spectrum being produced for the material resulting from step b) and before step c).

17. A method for preparing a hybrid aluminosilicate polymer, comprising the following steps:
   a) treating a mixed aluminum and silicon alkoxide of which the silicon has hydrolyzable substituents only, or a mixed aluminum and silicon precursor resulting from the hydrolysis of a mixture of aluminum compounds and silicon compounds only having hydrolyzable substituents, with an aqueous alkali, in the presence of silanol groups, the aluminum concentration being maintained at between $1.5 \times 10^{-2}$ and 0.3 mol/l, the Al/Si molar ratio being maintained between 1 and 3.6 and the alkali/Al molar ratio being maintained between 2.3 and 3
   b) stirring the mixture resulting from step a) at ambient temperature of between 15° C. and 35° C. in the presence of silanol groups long enough to form the hybrid aluminosilicate polymer; and then directly
   c) adding alkali to increase the alkali/Al molar ratio to 3 if required if this ratio has not already been reached in step a); and then directly
   d) eliminating the byproducts formed during steps a) and b) and c) from the reaction medium.

* * * * *